April 18, 1967   J. A. SCHOLL   3,314,315
SAFETY LEVER AND OIL SEAL BREAKING
TOOL FOR ROTARY TABLES
Filed April 28, 1965   2 Sheets-Sheet 1
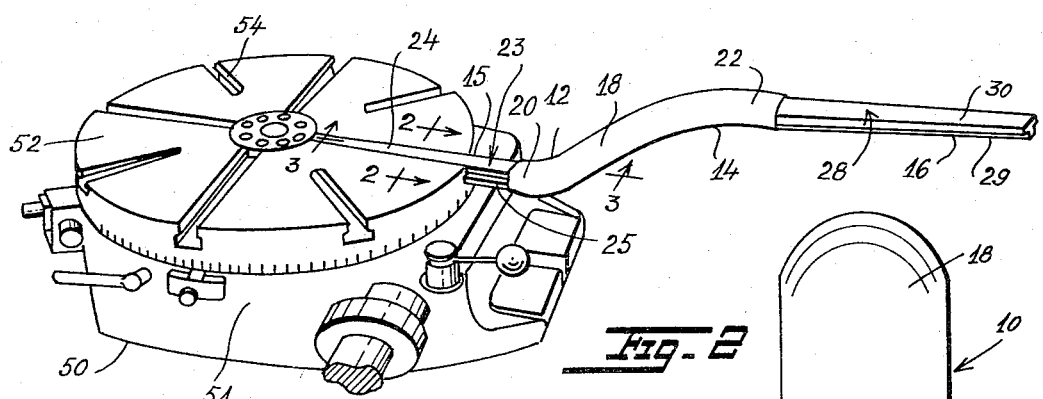
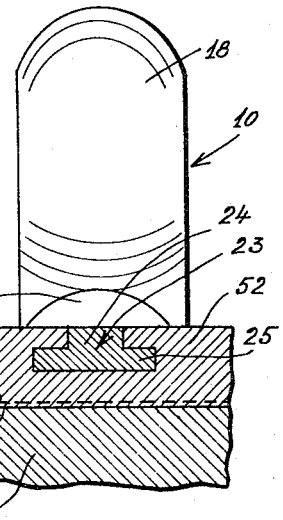
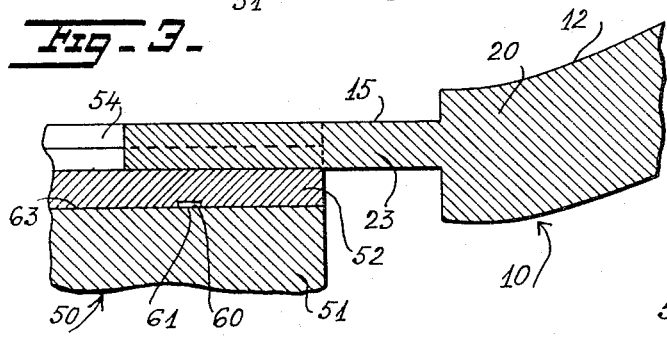
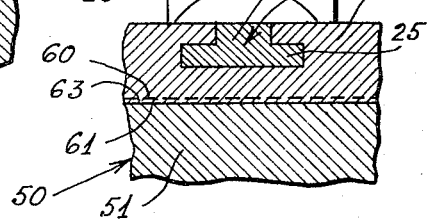
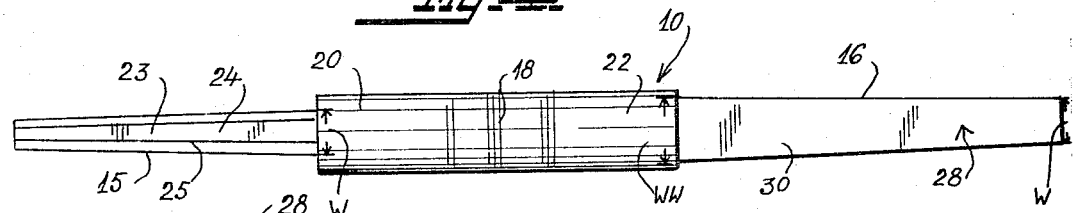
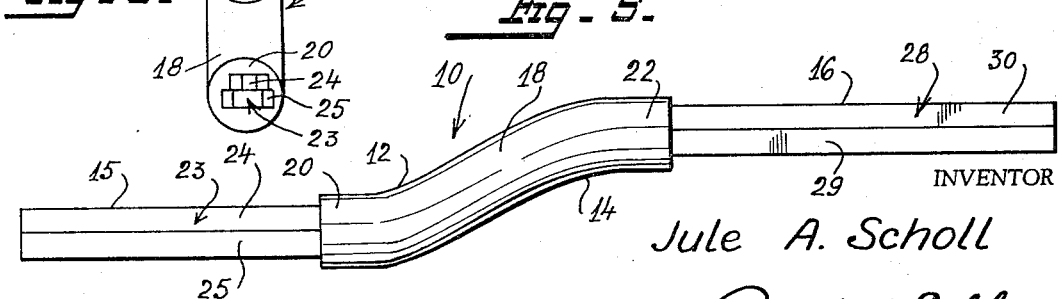
INVENTOR
Jule A. Scholl
BY Polachek & Saulsbury
ATTORNEYS.

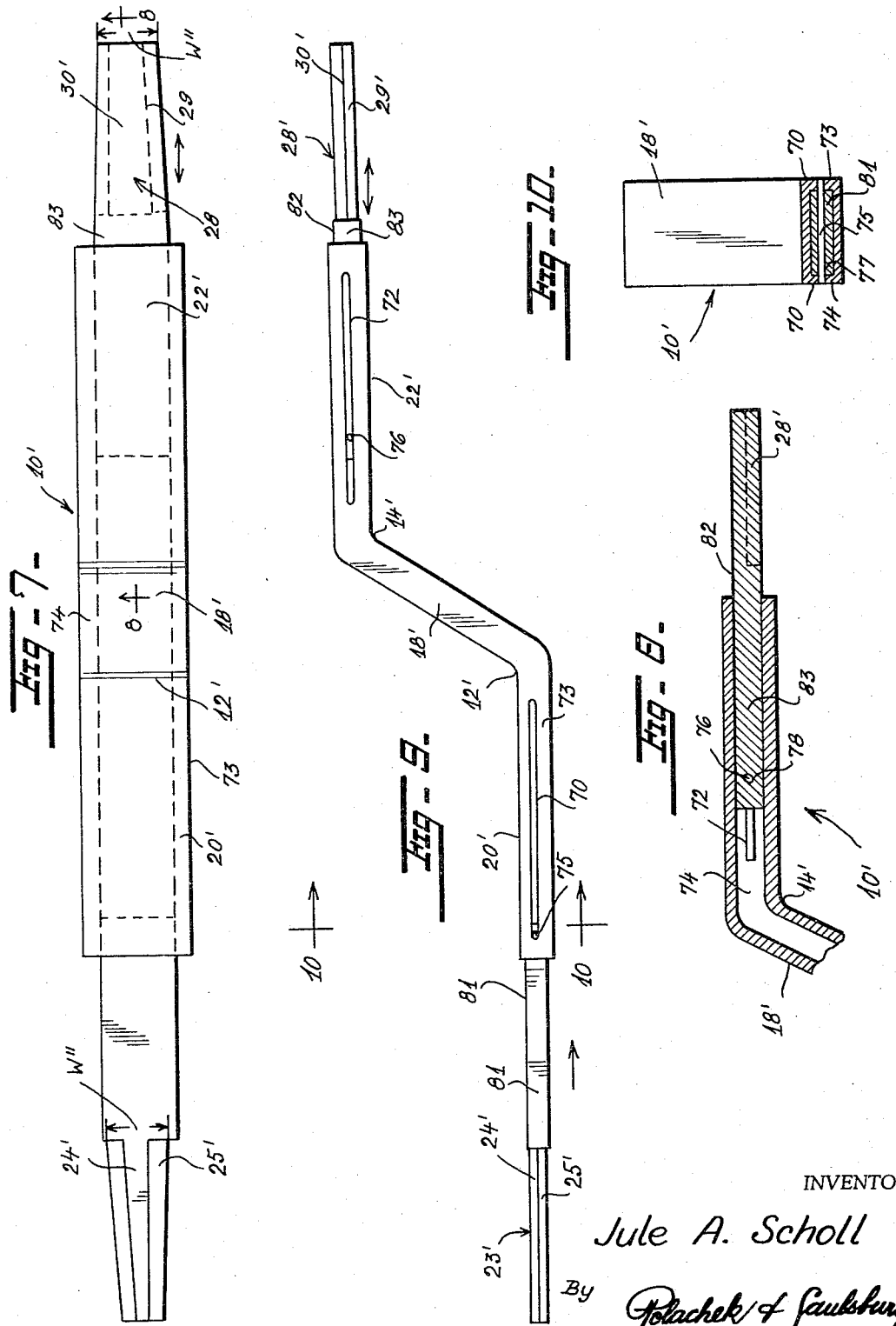

United States Patent Office 3,314,315
Patented Apr. 18, 1967

3,314,315
SAFETY LEVER AND OIL SEAL BREAKING
TOOL FOR ROTARY TABLES
Jule A. Scholl, 41—31 51st St.,
Woodside, N.Y. 11377
Filed Apr. 28, 1965, Ser. No. 451,504
9 Claims. (Cl. 81—3)

This invention concerns a tool which can be used to break the oil seal which forms between the rotary chuck table and the base plate of a rotary table assembly used in a machine tool.

Heretofore machinists have inserted their fingers into the dovetail T-grooves in the rotary tables and manually twisted the rotary table free from the base plate. Since the edges of the grooves are sharp and the table tends to spin rapidly when the oil seal is broken there is serious danger that the machinist's fingers may be caught and cut or even broken. These accidents have often happened. The present invention is directed at providing a tool which can be used to lift the rotary table for breaking the oil seal.

According to the invention, there is provided a tool having an elongated body made of a rigid steel bar or aluminium forging doubly bent so that opposite ends extend parallel to each other in vertically-spaced horizontal planes. The opposite ends of the bar are formed with tapered T-tongues which can be readily inserted selectively into any one of the T-grooves of a rotary chuck table. The tapered T-tongues which have different widths so that the tool can be used with rotary tables having different size grooves. In another form of the invention, the tool includes a tubular section into which tool bars are slidably fitted at opposite ends. The tool bars are formed with different size T-tongues for use in different sizes of rotary tables. The several tool bars can be telescoped into the tubular section for reducing the size of the safety lever and oil seal breaking tool when not in use.

It is therefore a principal object of the invention to provide a manually operable tool useful for breaking the oil seal which forms between a rotary chuck table and base plate in a work holding rotary table assembly of a machine tool preventing hand injury and providing additional leverage.

Another object is to provide a tool of the character described including a doubly bent bar with opposite ends formed with tapered T-tongues of different sizes.

A further object is to provide an oil seal breaking tool including a doubly bent tubular body with tool members slidably fitted in the tubular body, and with T-tongues of different sizes formed on ends of the respective tool members.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIGURE 1 is a perspective view of an oil seal breaking tool embodying the invention shown mounted for use on a rotary table, FIG. 2 and FIG. 3 are enlarged fragmentary sectional views taken on lines 2—2 and 3—3 of FIG. 1, FIG. 4 is a top plan view of the tool of FIG. 1 and on an enlarged scale, FIG. 5 is a side elevational view of the tool, FIG. 6 is an end view of the tool, FIG. 7 is a top plan view of another oil seal breaking tool embodying the invention, FIG. 8 is a fragmentary sectional view taken on line 8—8 of FIG. 7, FIG. 9 is a side view of the tool of FIG. 7, and FIG. 10 is a cross sectional view taken on line 10—10 of FIG. 9.

Referring first to FIGS. 1–6, there is shown an oil seal breaking tool 10. The tool has an elongated body made from a bar of tool steel or forged aluminum. The bar is doubly bent at bends 12 and 14 to define a central section 18 and two end sections 15, 16 offset from each other vertically and extending parallel to each other horizontally. Central section 18 has opposite end portions 20, 22 either one of which can be manually grasped during use of the tool.

End section 15 is formed with a tapered T-tongue 23 having a tapered ridge or pedestal 24 and a flat flange 25 with wings extending laterally of the ridge 24 at opposite sides thereof. In the working position of the tool as shown in FIGS. 1–5, the ridge 24 is uppermost and the flange 25 faces downwardly. End section 16 is formed with another tapered tongue 28 in which tapered ridge 29 faces downwardly and tapered flange 30 faces upwardly.

The tool is shown mounted for use on a rotary tool table assembly 50. This is a conventional assembly having a base plate 51 and rotary top table 52. In the upper side of the table are radially extending T-grooves 54. The narrow lateral opening in the groove is exposed at the top of the table. The grooves are T-shaped and parallel in form. The T-tongues 23 and 28 are tapered. It will be noted that the greatest width W of tapered tongue 23 where it joins end portion 20 of the central section 18 is equal to the width of tongue 28 at its outer free end. The width WW of the inner end of tongue 28 is wider than its outer free end. Thus the tool 10 can be used with a variety of tool table assemblies having different sizes of T-grooves.

It will be noted in FIG. 3 that the table 52 of tool assembly 50 has an annular groove 60 formed in its underside adjacent the upper face 61 of base plate 51. This groove 60 serves as a channel for lubricating oil. The oil spreads outwardly of groove 50 between the juxtaposed faces 61, 63 of plate 51 and table 52. Due to oil surface tension and suction, the rotary table will stick to the stationary base plate and prevent free rotation of the table with respect to the base plate. The tool 10 is used by inserting one end into a T-groove and pulling or rotationally pushing on the outer other end while turning the tool 10 and table 52. This will break the oil seal and suction holding the table 52 so that the table will then be free to rotate. The tool 10 can then be pulled out of the T-groove into which it is inserted. When the tool is used mechanical force is applied at point or bend 12 or 14 which serves as a fulcrum depending on which end of the tool is inserted into a T-groove. The tool 10 must be turned over 180 degrees from its position in FIGS. 1–5 and then turned around end for end in order to insert end section 16 into the selected T-groove of the table 52.

In FIGS. 7–10 is shown another oil seal breaking tool 10' which is generally similar to tool 10 and corresponding parts are identically identified by primed numbers. Tool 10' has a central section 18' formed of rectangular, rigid metal tubing doubly bent at spaced intermediate points 12', 14' to define two straight horizontal tubular end portions 20', 22' which are parallel to each other and offset vertically from each other. Slots 70, 72 are formed in opposite sides 73, 74 of the respective end portions 20', 22'. The slots extend longitudinally and receive ends of transversely extending removable pins 75, 76 inserted horizontally in bores 77, 78 of two rectangular tool bars 80, 82. If pins 75, 76 are removed tool bars 80, 82 can be interchanged with others.

Tool bar 80 has an outer end T-tongue 23' tapered in width from its narrower free end to its wider inner end at rectangular portion 81 of bar 80. Tool bar 82 has an outer end T-tongue 23' tapered in width from its narrower free end to its wider inner end at rectangular portion 81 of bar 80. Tool bar 82 has an outer end T-tongue 28' tapered in width from its narrower free end to its wider inner end at rectangular portion 83 of bar 82. T-tongue 23' has a tapered ridge 24' facing upwardly as shown in the drawing and a flat flange 25' facing downwardly. Wings of the flange 25' extend laterally outward of ridge 24'. Similarly T-tongue 28' has a tapered ridge 29' facing downwardly and flange 30' facing upwardly with wings arranged in a manner similar to that of tongues 23 and 28. The width W" at the inner end of tongue 23' is equal to the width W" of tongue 28' at its outer free end, in an arrangement similar to that of tongues 23 and 28.

The rectangular portion 83 of tool bar 82 is shown almost fully retracted into the tubular central section 18' as shown in FIGS. 7–9. The tool bar 80 is shown fully extended. The tool 10' can thus be reduced in size for convenience in carrying, storage and use. In addition different magnitudes of leverage can be exerted as the tool bars are selectively retracted in or extended from the central section 18'.

Tool 10' operates in the same manner as described in connection with tool 10 for moving the rotary table and breaking the oil seal locking the table to the base plate 51.

The tool 10 is made from a cylindrical bar but it could be made a rectangular bar of steel in the same manner as tool bars 80 and 82. Tool 10' is a more elaborate and expensive construction but may be preferred in well equipped machine shops where its greater versatility will be found useful.

In either form, the invention makes it possible to perform a necessary task which has always been found troublesome and dangerous, since heretofore it has been done by hand instead of by use of a proper tool.

The tools described are shaped to fit the particular grooves provided in the rotary tool tables. If other shaped grooves are provided in the tool tables, the tools 10 and 10' will have ends correspondingly shaped. In any case the ends of tools 10 and 10' should be shaped to correspond rather precisely to the grooves in the rotary table so as to prevent scratching, marring or otherwise damaging the rotary table by use of ill fitting safety levers and oil seal breaking tools.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A tool for breaking an oil seal between a rotary table and a base plate in a rotary table and plate assembly for a machine tool, wherein said table has at least one radial dovetail groove and extending inwardly from the periphery thereof, comprising a bar having a central section doubly bent at spaced points to define two horizontal parallel socketed end portions spaced laterally from each other at opposite ends of said section, and a dovetail tongue aligned with and received in one of said portions of the central section, said tongue fitting in said groove, whereby the oil seal between the rotary table and base plate is broken when said tongue is inserted longitudinally into said groove and the other end portion of said central section is manually grasped and moved laterally.

2. A tool for breaking an oil seal between a rotary table and a base plate in a rotary table and plate assembly for a machine tool, wherein said table has at least one radial dovetail groove extending inwardly from the periphery thereof, comprising a bar having a central section doubly bent at spaced points to define two horizontal parallel end portions spaced laterally from each other at opposite ends of said section, a dovetail tongue aligned with one of said portions of the central section, said tongue fitting in said groove whereby the oil seal between the rotary table and base plate is broken when said tongue is inserted longitudinally into said groove and the other end portion of said central section is manually grasped and moved laterally, and another dovetail tongue aligned with the other end portion of the central section for insertion into another groove when the tool is turned over and is turned end for end, each of the tongues being T-shaped in cross section throughout its length.

3. A tool for breaking an oil seal between a rotary table and a base plate in a rotary table and plate assembly for a machine tool, wherein said table has at least one radial dovetail groove extending inwardly and from the periphery thereof, comprising a bar having a central section doubly bent at spaced points to define two horizontal parallel end portions spaced laterally from each other at opposite ends of said section, a dovetail tongue aligned with one of said portions of the central section, said tongue fitting in said groove, whereby the oil seal between the rotary table and base plate is broken when said tongue is inserted longitudinally into said groove and the other end portion of said central section is manually grasped, and moved laterally, and another dovetail tongue aligned with the other end portion of the central section for insertion into another groove when the tool is turned over and is turned end for end, each of the tongues being T-shaped in cross section throughout its length, the widest width of the first named tongue at its inner end adjoining said one end portion of the central section being equal to the narrowest width of said other tongue at its outer free end.

4. A tool for breaking an oil seal between a rotary table and a base plate in a rotary table and plate assembly for a machine tool, wherein said table has at least one radial dovetail groove extending inwardly from the periphery thereof, comprising a bar having a central section doubly bent at spaced points to define two horizontal parallel end portions spaced laterally from each other at opposite ends of said section, a dovetail tongue aligned with one of said portions of the central section, said tongue fitting in said groove whereby the oil seal between the rotary table and base plate is broken when said tongue is inserted longitudinally into said groove and the other end portion of said central section is manually grasped and moved laterally, and another dovetail tongue aligned with the other end portion of the central section for insertion into another groove when the tool is turned over and is turned end for end, each of the tongues being T-shaped in cross section throughout its length, said tongues constituting members separate from said central section and attached thereto.

5. A tool for breaking an oil seal between a rotary table and a base plate in a rotary table and plate assembly for a machine tool, wherein said table has at least one radial dovetail groove extending inwardly from the periphery thereof, comprising a tubular bar having a central section doubly bent at spaced points to define two horizontal parallel end portions spaced laterally from each other at opposite ends of said central section, a tool bar having one end slidably fitted on one end portion of the central section, a dovetail tongue at the other end of said tool bar and aligned with the one end thereof, said tongue fitting in said groove whereby the oil seal between the rotary table and base plate is broken when said tongue is inserted longitudinally into said groove and the other end portion of said central section is manually grasped and moved laterally, another tool bar having one end slidably fitted in the other end portion of the central section, another dovetail tongue at the other end of the other tool bar and aligned with the one end thereof for insertion into another groove when the tool is turned over and is turned end for end.

6. A tool for breaking an oil seal between a rotary table and a base plate in a rotary table and plate assembly for a machine tool, wherein said table has at least one radial dovetail groove extending inwardly from the periphery thereof, comprising a tubular bar having a central section doubly bent at spaced points to define two horizontal parallel end portions spaced laterally from each other at opposite ends of said central section, a tool bar having one end slidably fitted on one end portion of the central section, a dovetail tongue at the other end of said tool bar and aligned with the one end thereof, said tongue fitting in said groove whereby the oil seal between the rotary table and base plate is broken when said tongue is inserted longitudinally into said groove and the other end portion of said central section is manually grasped, and moved laterally, another tool bar having one end slidably fitted in the other end portion of the central section, another dovetail tongue at the other end of the other tool bar and aligned with the one end thereof for insertion into another groove when the tool is turned over and is turned end for end, each of the tongues being T-shaped in cross section throughout its length.

7. A tool for breaking an oil seal between a rotary table and a base plate in a rotary table and plate assembly for a machine tool, wherein said table has at least one radial dovetail groove extending inwardly from the periphery thereof, comprising a tubular bar having a central section doubly bent at spaced points to define two horizontal parallel end portions spaced laterally from each other at opposite ends of said central section, a tool bar having one end slidably fitted on one end portion of the central section, a dovetail tongue at the other end of said tool bar and aligned with the one end thereof, said tongue fitting in said groove whereby the oil seal between the rotary table and base plate is broken when said tongue is inserted longitudinally into said groove and the other end portion of said central section is manually grasped and moved laterally, another tool bar having one end slidably fitted in the other end portion of the central section, another dovetail tongue at the other end of the other tool bar and aligned with the one end thereof for insertion into another groove when the tool is turned over and is turned end for end, said central section and the one end portion of the tool bars both being rectangular in cross section so that the tool bars are held non-rotatably in the central section.

8. A tool for breaking an oil seal between a rotary table and a base plate in a rotary table and plate assembly for a machine tool, wherein said table has at least one radial dovetail groove extending inwardly from the periphery thereof, comprising a tubular bar having a central section doubly bent at spaced points to define two horizontal parallel end portions spaced laterally from each other at opposite ends of said central section, a tool bar having one end slidably fitted on one end portion of the central section, a dovetail tongue at the other end of said tool bar and aligned with the one end thereof, said tongue fitting in said groove whereby the oil seal between the rotary table and base plate is broken when said tongue is inserted longitudinally into said groove and the other end portion of said central section is manually grasped and moved laterally, another tool bar having one end slidably fitted in the other end portion of the central section, another dovetail tongue at the other end of the other tool bar and aligned with the one end thereof for insertion into another groove when the tool is turned over and is turned end for end, said central section and the one end portion of the tool bars both being rectangular in cross section so that the tool bars are held non-rotatably in the central section, the widest width of the first named tongue at its inner end adjoining said one end portion of the central section being equal to the narrowest width of said other tongue at its outer free end.

9. A tool for breaking an oil seal between a rotary table and a base plate in a rotary table and plate assembly for a machine tool, wherein said table has at least one radial dovetail groove extending inwardly from the periphery thereof, comprising a tubular bar having a central section doubly bent at spaced points to define two horizontal parallel end portions spaced laterally from each other at opposite ends of said central section, a tool bar having one end slidably fitted on one end portion of the central section, a dovetail tongue at the other end of said tool bar and aligned with the one end thereof, said tongue fitting in said groove whereby the oil seal between the rotary table and base plate is broken when said tongue is inserted longitudinally into said groove and the other end portion of said central section is manually grasped and moved laterally, another tool bar having one end slidably fitted in the other end portion of the central section, another dovetail tongue at the other end of the other tool bar and aligned with the one end thereof for insertion into another groove when the tool is turned over and is turned end for end, said central section and the one end portion of the tool bars both being rectangular in cross section so that the tool bars are held non-rotatably in the central section, the widest width of the first named tongue at its inner end adjoining said one end portion of the central section being equal to the narrowest width of said other tongue at its outer free end, said end portions of the central sections having slotted walls, and pins removably fitted in the one end of the tool bars and slidable in slots in said walls, whereby the tool bars are held telescopically in said central section and whereby the tool bars can be removed and interchanged with others when the pins are removed therefrom.

References Cited by the Examiner

UNITED STATES PATENTS

| | | | |
|---|---|---|---|
| D. 168,534 | 1/1953 | Council | 254—131 |
| 1,516,099 | 11/1924 | Hill | 7—15 XR |
| 1,559,976 | 11/1925 | Ness | 254—131 |
| 1,683,373 | 9/1928 | Ross et al. | 15—105.5 |

FOREIGN PATENTS 369,238   2/1923   Germany.

WILLIAM FELDMAN, *Primary Examiner.*

OTHELL M. SIMPSON, *Examiner.*